(12) United States Patent
Rogers et al.

(10) Patent No.: US 8,452,484 B2
(45) Date of Patent: *May 28, 2013

(54) WIRELESS NETWORK AND METHODOLOGY FOR AUTOMOTIVE SERVICE SYSTEMS

(75) Inventors: Steven W. Rogers, Conway, AR (US); George M. Gill, Vilonia, AR (US); Robert O. Moran, Conway, AR (US)

(73) Assignee: Snap-On Incorporated, Kenosha, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/281,043

(22) Filed: Oct. 25, 2011

(65) Prior Publication Data

US 2012/0042031 A1 Feb. 16, 2012

Related U.S. Application Data

(63) Continuation of application No. 11/878,025, filed on Jul. 20, 2007, now Pat. No. 8,073,586.

(51) Int. Cl.
| | |
|---|---|
| *B60R 16/0234* | (2006.01) |
| *B60C 23/0479* | (2006.01) |
| *B60C 25/00* | (2006.01) |
| *H04W 84/12* | (2009.01) |
| *H04W 84/20* | (2009.01) |
| *G07C 5/0866* | (2006.01) |

(52) U.S. Cl.
USPC .................................. 701/31.5; 701/34.3

(58) Field of Classification Search
USPC ................................................ 701/31.5, 34.3
IPC .................. B60C 23/0479,25/00; G07C 5/008, G07C 5/0866; G01C 17/02; H04L 12/44, H04L 12/28; H04W 84/12, 84/18, 84/20
See application file for complete search history.

(56) References Cited

U.S. PATENT DOCUMENTS

| | | |
|---|---|---|
| 5,392,285 A | 2/1995 | Kurts |
| 6,366,622 B1 | 4/2002 | Brown et al. |

(Continued)

FOREIGN PATENT DOCUMENTS

WO  WO 01/26338 A  4/2001

OTHER PUBLICATIONS

Bluetooth Sig. Bluetooth Specification Version 2.0 + EDR. Adopted on Nov. 4, 2004. http://www.bluetooth.org/docman/handlers/DownloadDoc.ashx?doc_id=40560&ei=25GiT8L3CuTa0QGnmqDVDA&usg=AFQjCNGXY5pm4Tkju1KGs4dYRJLtd03FEg Downloaded May 3, 2012.*

(Continued)

*Primary Examiner* — Mark Hellner
*Assistant Examiner* — Ari M Diacou
(74) *Attorney, Agent, or Firm* — McDermott Will & Emery LLP (57) ABSTRACT

A method and apparatus are provided for forming a wireless communications network using a standard communications link between a master controller and at least one slave device. In one example, a list of available slave devices for the network is generated, valid slave devices are determined from the list of available slave devices based on an identification protocol of the standard communications link, and the at least one slave device is selected from the valid slave devices. A network identification is established between the master controller and the at least one slave device, and the network identification is used to establish a network comprising only the master controller and the at least one slave device.

11 Claims, 4 Drawing Sheets

U.S. PATENT DOCUMENTS

| | | |
|---|---|---|
| 6,442,460 B1 | 8/2002 | Larson et al. |
| 6,463,373 B2 | 10/2002 | Suganuma et al. |
| 6,484,082 B1 | 11/2002 | Millsap et al. |
| 6,754,562 B2 | 6/2004 | Strege et al. |
| 6,757,521 B1 | 6/2004 | Ying |
| 6,822,582 B2 | 11/2004 | Voeller et al. |
| 7,606,657 B2 * | 10/2009 | Hessling et al. .............. 701/454 |
| 2004/0210362 A1 | 10/2004 | Larson et al. |
| 2005/0046584 A1 * | 3/2005 | Breed .................. 340/825.72 |
| 2005/0171662 A1 | 8/2005 | Strege et al. |
| 2006/0280181 A1 * | 12/2006 | Brailas et al. ................ 370/392 |
| 2007/0244611 A1 | 10/2007 | Brozovich |
| 2008/0077290 A1 * | 3/2008 | Weinmann et al. ............ 701/35 |
| 2009/0073425 A1 * | 3/2009 | Kling et al. ............. 356/139.09 |

OTHER PUBLICATIONS

"Bluetooth From Wikipedia, the free encyclopedia" retrieved from http://en.wikipedia.org/wiki/Bluetooth.

"Bluetooth Basics" retrieved from http://www.bluetooth.com/Bluetooth/learn/.

European Search Report issued in European Patent Application No. EP 08782068.4 dated Oct. 28, 2010.

International Search Report issued in International Patent Application No. PCT/US2008/070484, mailed Oct. 3, 2008.

* cited by examiner

FIG. 4

WIRELESS NETWORK AND METHODOLOGY FOR AUTOMOTIVE SERVICE SYSTEMS

RELATED APPLICATIONS

This application is a Continuation of U.S. application Ser. No. 11/878,025, filed on Jul. 20, 2007, the disclosure of which is incorporated by reference herein.

TECHNICAL FIELD

The present subject matter relates to automotive service systems, such as wheel alignment systems. The present disclosure has particular applicability to wireless communications between components of an automotive service system.

BACKGROUND ART

A current conventional vehicle wheel alignment system uses sensors or heads that are attached to the wheels of a vehicle to measure various angles of the wheels and suspension. These angles are communicated to a host system, where they are used in the calculation of vehicle alignment angles. In the standard conventional aligner configuration, four alignment heads are attached to the wheels of a vehicle. Each sensor head comprises two horizontal or toe measurement sensors and two vertical or camber/pitch sensors. Each sensor head also contains electronics to support overall sensor data acquisition as well as communications with the aligner console, local user input, and local display for status feedback, diagnostics and calibration support. The four sensors and electronics as well as the mechanical housing that makes up each head necessarily is duplicated four times, as there is one for each wheel.

In recent years, wheels of motor vehicles have been aligned in some shops using a computer-aided, three-dimensional (3D) machine vision alignment system. In such a system, one or more cameras view targets attached to the wheels of the vehicle, and a computer in the alignment system analyzes the images of the targets to determine wheel position and alignment of the vehicle wheels from the wheel position data. The computer typically guides an operator to properly adjust the wheels for precise alignment, based on calculations obtained from processing of the image data. A wheel alignment system or aligner of this image processing type is sometimes called a "3D aligner." An example of a vehicle wheel aligner using such image processing is the Visualiner 3D or "V3D", commercially available from John Bean Company, Conway, Ark., a division of Snap-on Incorporated.

Alternatively, a machine vision wheel alignment system may include a pair of passive heads and a pair of active sensing heads. The passive heads are for mounting on a first pair of wheels of a vehicle to be measured, and the active sensing heads are for mounting on a second pair of wheels of the vehicle. Each passive head includes a target, and each active sensing head includes an image sensor for producing image data, including an image of a target of one of the passive heads, when the various heads are mounted on the respective wheels of the vehicle. The system also includes a spatial relationship sensor associated with at least one of the active sensing heads, to enable measurement of the spatial relationship between the active sensing heads when the active sensing heads are mounted on wheels of the vehicle. The system further includes a computer for processing the image data relating to observation of the targets, as well as positional data from the spatial relationship sensor, for computation of at least one measurement of the vehicle.

Since each of the above-described wheel alignment systems includes a computer and at least two remote sensor units (e.g., alignment heads, cameras or sensing heads), it is desirable to provide wireless communications between the computer "base station" and the remote sensor units. Typical wireless network structures utilized in such automotive service systems are based on proprietary wireless technologies. In general, non-indigenous proprietary or sole source technologies can provide specific solutions to technical requirements, be fast-to-market, and provide low cost product functionality without expending valuable internal development resources. Unfortunately, these proprietary technologies also generally become obsolete well before the end of a service system product life cycle. They may also constrain overall product performance and reliability to the specific performance and reliability of a sole source device. Often, the changes required to replace a proprietary technology can be expensive and can lead to reliability and service issues.

In contrast, standard or multi-source solutions are designed for a broad consumer market and often fall short of the specific functionality required for automotive service systems in a garage environment. Following the pressures of a consumer market place, standard technologies can also change quickly as the market changes and therefore may require frequent incremental product design changes. Unless these changes are easily accommodated, a hosting product can suffer reliability and service cost consequences. In addition, many standard technologies are designed to reach across a broad market accommodating many different performance and functional requirements. This technical flexibility typically results in complex setup procedures or configurations that can be inadvertently modified by an unsuspecting or untrained user. Sometimes a user may be somewhat familiar with a standard technology and try to modify or adapt a configuration to include unintended devices or features that can detrimentally affect the performance or render the hosting product nonfunctional.

There exists a need for an apparatus and methodology for a wireless network structure utilizing standard wireless technology for low cost, while also providing simplified installation to a service system host, ease of service bay network setup, and increased network performance.

SUMMARY OF THE INVENTION

The teachings herein improve over conventional wireless automotive service systems by implementing a wireless network utilizing standard technologies, while including a custom wireless access point to manage the configuration and setup of the network as well as providing a connection to the host service system.

According to the present disclosure, the foregoing and other advantages are achieved in part by a method for forming a wireless communications network, using a standard communications link, between a master controller and at least one slave device. The method comprises generating a list of available slave devices for the network having the standard communications link; determining valid slave devices from the list of available slave devices based on an identification protocol of the standard communications link; selecting the at least one slave device from the valid slave devices; establishing a network identification between the master controller and the at least one slave device; and using the network identification to establish a network comprising only the master controller and the at least one slave device.

In accord with another aspect of the disclosure, a vehicle service system comprises a main processor, a master controller and at least one slave device. The master controller is for wirelessly communicating with the at least one slave device using a standard communications link, and the at least one slave device is for gathering vehicle service data and transmitting the data to the master controller via the standard communications link. The master controller includes a processor configured to preliminarily process the data. The main processor and the master controller are in communication with each other, and the processor of the master controller sends the preliminarily processed data to the main processor for further processing.

Additional advantages and other features of the present disclosure will be set forth in part in the description which follows and in part will become apparent to those having ordinary skill in the art upon examination of the following or may be learned from the practice of the invention. The advantages of the disclosure may be realized and obtained as particularly pointed out in the appended claims.

BRIEF DESCRIPTION OF THE DRAWINGS

Reference is made to the attached drawings, wherein elements having the same reference numeral designations represent like elements throughout, and wherein.

DESCRIPTION OF THE INVENTION

The examples shown in the various drawings provide a proprietary, low cost, high performance, reliable wireless network consisting of embedded wireless devices and a wireless access point connected to the service system host. The disclosed wireless network is "non-adaptable" insofar as only a limited number of pre-approved wireless devices can be used to form the network, and after the network has been established, the wireless access point does not normally search for such additional wireless devices. In a dedicated service system, such as a wheel alignment system, it is advantageous to only allow known devices or standard components of the service system to establish wireless links as part of a proprietary closed or non-adaptable wireless network. As an element of this disclosure, the wireless access point will manage these links as part of a closed pre-established proprietary wireless network.

In certain disclosed examples, the wireless access point preprocesses sensor data and/or calculates alignment angles, then sends the information to the system host for display and user interaction. The wireless access point can also implement a proprietary interface or, alternatively, a standard web server interface capable of providing web pages for service system network setup, as well as provide service data and results to a browser based client or host.

More particularly, certain examples shown in the drawings implement a wireless network utilizing standard technologies, but include a custom wireless access point to manage the configuration and setup of the network as well as provide a connection to the host service system via a well established, standard communications means such as Ethernet. One purpose of the custom wireless access point is to configure the standard wireless technology in such a way as to establish a specific (e.g., proprietary) non-adaptable network configured for robust passive master/slave based communications. The custom wireless access point also creates a layer of abstraction between a standard well-established long term communication technology such as Ethernet, and a standard but potentially changing wireless network technology such as Bluetooth, whereby changes in the wireless technology are managed by the access point and not by the service system host. It will be understood that other radio technologies besides Bluetooth can be used in the disclosed wireless network, such as Ultra Wide Band (UWB), 802.11 (WiFi), or 802.15.4/Zigbee.

Figure 1:
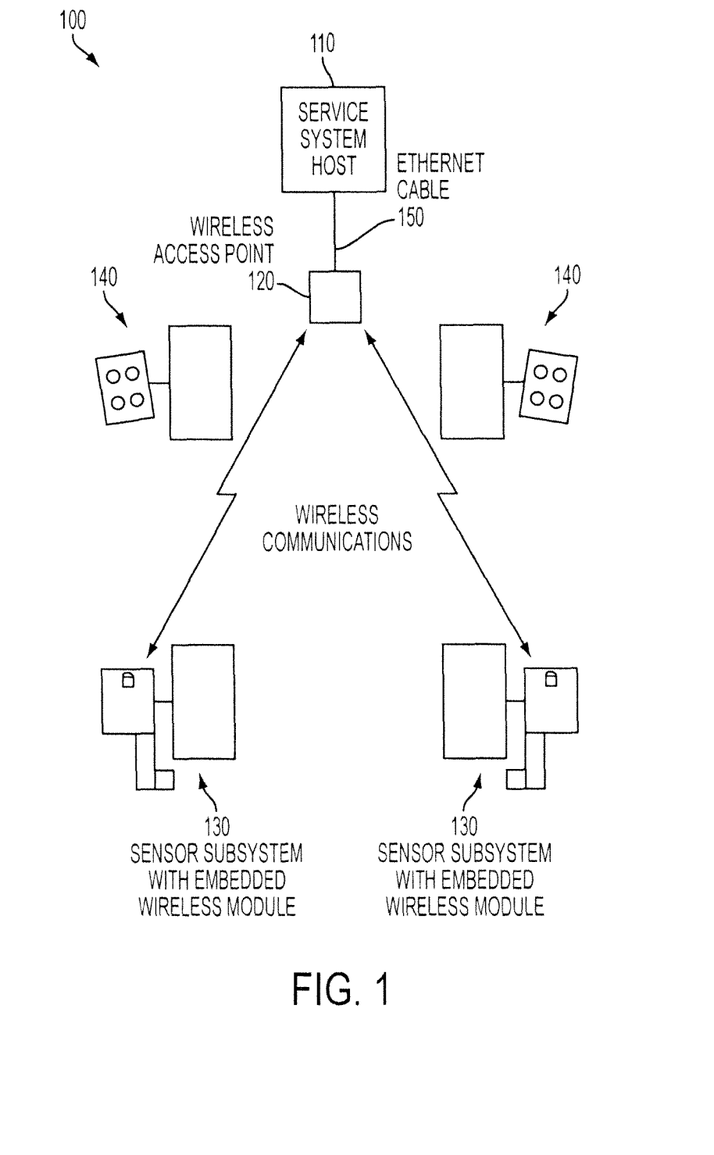
FIG. 1 is a functional block diagram of a wheel alignment system according to the present disclosure.
Figure 2:
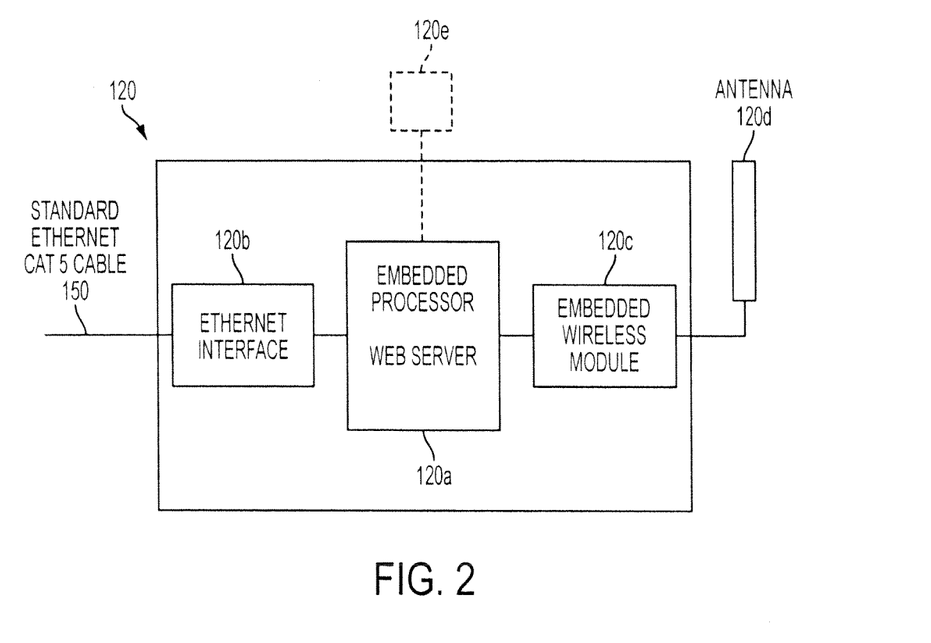
FIG. 2 is a function block diagram of a master controller for use in the system of claim 1.

FIGS. 1 and 2 depict a wheel alignment system, such as a conventional aligner or imaging aligner, wherein an embedded wireless module is connected to the sensor or camera subsystem, thereby creating a wireless sensor subsystem communication link. Elements of the vehicle are omitted for ease of illustration.

Referring now to FIG. 1, an exemplary vehicle service system 100, such as a vehicle wheel alignment system, comprises a main processor 110 also called the service system host; a master controller 120, also called a wireless access point; a pair of slave devices 130, such as active sensor heads, also called sensor pods; and a pair of passive heads or targets 140. Of course, the number of slave devices 130 and targets 140 will vary depending on the type of service system. The master controller 120 is for wirelessly communicating with the slave devices 130 using a conventional standard communications protocol, such as Bluetooth. The slave devices 130 are for gathering vehicle service data and transmitting the data to the master controller 120 via the standard communications protocol. The master controller 120 is connected to the main processor 110 via a standard communications link, such as Ethernet, via a cable 150.

As shown in FIG. 2, in this example, the master controller 120 includes a processor 120a configured to preliminarily process the data from slave devices 130, an interface 120b, such as an Ethernet interface, for connecting processor 120a to main processor 110 via cable 150, and an embedded wireless module 120c and antenna 120d for wirelessly communicating with slave devices 130. Thus, the main processor 110 and the master controller 120 are in communication with each other, and the processor 120a of the master controller 120 sends the preliminarily processed data to the main processor 110 for further processing. In the wheel alignment system 100, the data from sensor pods 130 is measurement data or diagnostic data, and the master control processor 120a and main processor 110 are for calculating results, such as vehicle wheel alignment angles, in a manner appropriate to the particular wheel alignment system.

In FIGS. 1 and 2, the main processor 110 and the master controller 120 are depicted as separate components. However, they can be integrated with each other in the same "box" if desired. Alternatively, any specific service system device, such as a sensor or camera subsystem, could include the master controller 120 and manage the links of the wireless network. As discussed above, the wireless access point (master controller 120) provides the necessary bridge from the wireless network to the service system host (main processor 110) via a standard communication interface; i.e., Ethernet interface 120b.

In certain examples, the wireless access point/master controller 120 performs some or all of the service system host functionality; for example, pre-processing the service system data collected by the slave devices 130 so a lower performance main processor 110 can be used in the system host. In some examples, master controller 120 calculates vehicle alignment angles from sensor data, and serves the results to a client, such as web pages to a browser-based client. In further examples, the master controller 120 stores, processes, and/or provides vehicle specification data, such as alignment specifications.

The master controller 120 could also be enabled to perform system level maintenance functions. Since master controller 120 can be "intelligent;" that is, include standard components of a personal computer such as a hard drive, memory, etc., it could be used to monitor the slave devices 130, as for battery life, and/or to monitor and perform diagnostics on main processor 110. In certain examples, a technician performs set-up procedures on the service system through master controller 120, as by sending instructions over the Internet.

Optionally, the master controller 120 provides an intelligent gateway to other networked service system hosts or sensors. In certain examples, the master controller 120 provides a communications link between an alignment system, of which it is a part, and a conventional shop-wide management system. This enables the shop management system to provide information to the alignment system, and/or enables alignment results to be sent directly to the shop management system. In other examples, the master controller 120 provides raw data or diagnostic results to another service system, such as a collision repair system (e.g., a frame repair machine) or another alignment system. In still further examples, the master controller 120 networks with sensors other than sensor pods 130, such as a vehicle's internal sensors, external tire pressure sensors, ride height sensors, steering wheel angle sensors, etc.

Referring again to FIG. 2, an exemplary embedded wireless module 120c is the GS-BT2416C1 Bluetooth Class 1 Module manufactured by the STMicroelectronics Corporation with headquarters in Geneva, Switzerland. Bluetooth is a wireless industry standard communications link consisting of various protocol layers and service functions. Embedded Bluetooth devices can be found in PDAs, cell phones, laptops and other consumer and industrial electronics. The STMicroelectronics Bluetooth module is a highly integrated device with support of all Bluetooth HCI layer messages defined in the Bluetooth SIG 1.1 specification.

The STMicroelectronics Bluetooth module is designed to be incorporated into a computing device where it can transmit a general or limited inquiry message which can be received and acknowledged by another Bluetooth device in proximity thereby establishing a communications link. The first time the link is established, a common link key is created and shared with each device as part of an authentication process called pairing. If the link has been previously established then the authentication is automatically accepted by the initiating Bluetooth device. Initially establishing the link and pairing the devices generally requires some level of prior setup of the devices or specific device knowledge by a user, such as device name and common link key.

An adaptable Bluetooth network capable of establishing a link with any previously unpaired Bluetooth device requires some level of user interaction with at least one of the devices to create and configure the common link key. In a dedicated automotive service system, such as a wheel alignment system, it is advantageous to only allow known devices or standard components of the service system to establish wireless links as part of a proprietary closed or non-adaptable wireless network. As an element of this disclosure, the wireless access point (e.g., master controller 120) will manage these links as part of a closed pre-established proprietary wireless network.

According to certain examples of this disclosure, each device within a proprietary wireless network (e.g., slave devices 130) is pre-configured with a specific name and link key code. The network controller 120 establishes a link with each slave device 130 utilizing pre-configured knowledge of the devices' names and key codes, then authorization occurs using this device information without user interaction. Regardless of which service system device manages the wireless network links, only known, pre-established slave devices can participate in the network. Each such wireless network device could operate in a non-discoverable mode, hidden from other non-proprietary devices in proximity to the network. Even if other non-proprietary devices discover devices within the proprietary closed network, they are denied access, thereby preserving the integrity and performance of the disclosed wireless network.

Moreover, performance of the disclosed wireless network is enhanced, and the reliability of the data transfer is improved, by coordinating the transfer of data in a deterministic and consistent manner. Once the wireless communications links are initiated and the proprietary network is established, the master controller 120 coordinates all information transfers within a passive network configuration. More specifically, the master device 120 will request information, as required or on a periodic basis. All other non-master network devices, such as slave devices 130, will only transmit in response to specific requests from the master controller 120. This master/slave configuration preserves bandwidth by avoiding transmission collisions and retries that invariably occur when network devices communicate ad-hoc. In cases where it is beneficial to conserve power, the slave devices 130 can power down or enter a sleep mode, periodically waking up at predetermined time intervals to receive commands and data requests from the master controller 120. In addition, the master controller 120 or slaves 130 know if communication problems exist as successive master/slave communication intervals are missed. This deterministic communications scheme allows for alternative backup configurations or communications paths to be quickly established and used until normal network links are restored, resulting in very little perceived communications delays to the user.

A methodology will now be described to set up and optimally use the above-described wireless network, including a "discovery mechanism" that allows many of the same type of slave devices to be used in close proximity to each other without interfering with each other's network. For example, an automotive service shop may have more than one wheel aligner with a wireless network, or a shop very nearby may have an aligner with a wireless network. It is desirable to set up a network so the master radio associated with a control console only communicates with the wireless sensor pods that are assigned to that console, and the slave radios in the sensor pods will only communicate to their assigned console. Thus, according to the present teaching, in a shop with two wheel aligners where one aligner comprises measuring pods A and B and the other aligner comprises measuring pods C and D, one console is set up to communicate exclusively with sensor pods A and B, while another console is set up to communicate exclusively with pods C and D.

In order to easily configure the systems to accomplish this objective, a training mode is utilized. During the training phase, the master radio (console) will scan for nearby devices (referred to as an inquiry). There may be a defined maximum number of responses from the inquiry before the inquiry is considered complete. When the scanning has determined the "available" devices (each has a unique BlueTooth Device Address), an attempt is made to create an Asynchronous Connection Oriented (ACL) connection to each device Several exemplary methods for establishing the ACL and a piconet will now be described, referring to the components of FIGS. 1 and 2. A system for implementing these methods comprises master controller 120 and at least one slave device 130, the system using a standard communications link, such as Bluetooth, between the master controller 120 and the at least one slave device 130 to form a wireless communications network. To implement these methods, the master controller processor 120a is configured to perform the steps of generating a list of available slave devices for the network; determining valid slave devices 130 from the list of available slave devices based on an identification protocol of the standard communications link; selecting the at least one slave device 130 from the valid slave devices; establishing a network identification between the master controller 120 and the at least one slave device 130; and using the network identification to establish a network comprising only the master controller 120 and the at least one slave device 130. In some examples, master controller 120 has a unique PIN to establish a communication network with a set of desired sensor pods. This allows several consoles in the same vicinity to only communicate with the proper sensors. In other examples, unique PINs are not used, but the Bluetooth Addresses of the desired sensor pods are used to establish a communications network.

One exemplary method for establishing a wireless network according to this disclosure uses personal identification number (PIN) codes to distinguish the sensor pods from other nearby devices (such as Bluetooth phones, PDAs, etc). Each slave radio (e.g., sensor pod) will contain a default PIN code that is used for authentication, and will have a unique identification address per the standard communications link, such as a Bluetooth address (BDADDR). The master controller 120 of an aligner system will try to establish the connection with the pods using the default PIN. It is possible that a pod may contain a different PIN than the default PIN if there are multiple aligners in the shop or very nearby area. There is a finite set of predefined PIN codes that are allowed by the master controller 120. If a connection cannot be established with a pod using the default PIN the aligner may try to establish the ACL connection using each of the other predefined PIN's until a connection is made or all of the predefined PIN's are used. Only pods that respond to one of the predefined PIN's are allowed to authenticate on the aligner sensor network.

If the connection is successful, the device is considered a "valid" device and recorded as such. If the connection failed, after a defined number of attempts, the device is ignored (it is assumed to be some Bluetooth device other than a sensor pod). There may be a defined maximum number of allowed ACL connections. If this number is reached, further connection attempts to any other devices will be ceased.

Once the list of "valid" devices is known (e.g., sensor pods in the area), a piconet can be formed. A piconet consists of one master radio (master controller 120) and one or more slave radios (sensor pods 130). Each device 130 in a piconet will be assigned the same PIN code. If a shop has more than one aligner, each one may establish a piconet with a different PIN. There will be a predefined set of PIN codes that can be used for assignment. The PIN code assigned can be selected from a menu on the console (connected to and controlled by the master controller 120). This selection can be made indirectly based upon bay location, store location, or other identifying means. Internally to the software of the master controller 120, a unique PIN will be assigned for the given location.

Figure 3:
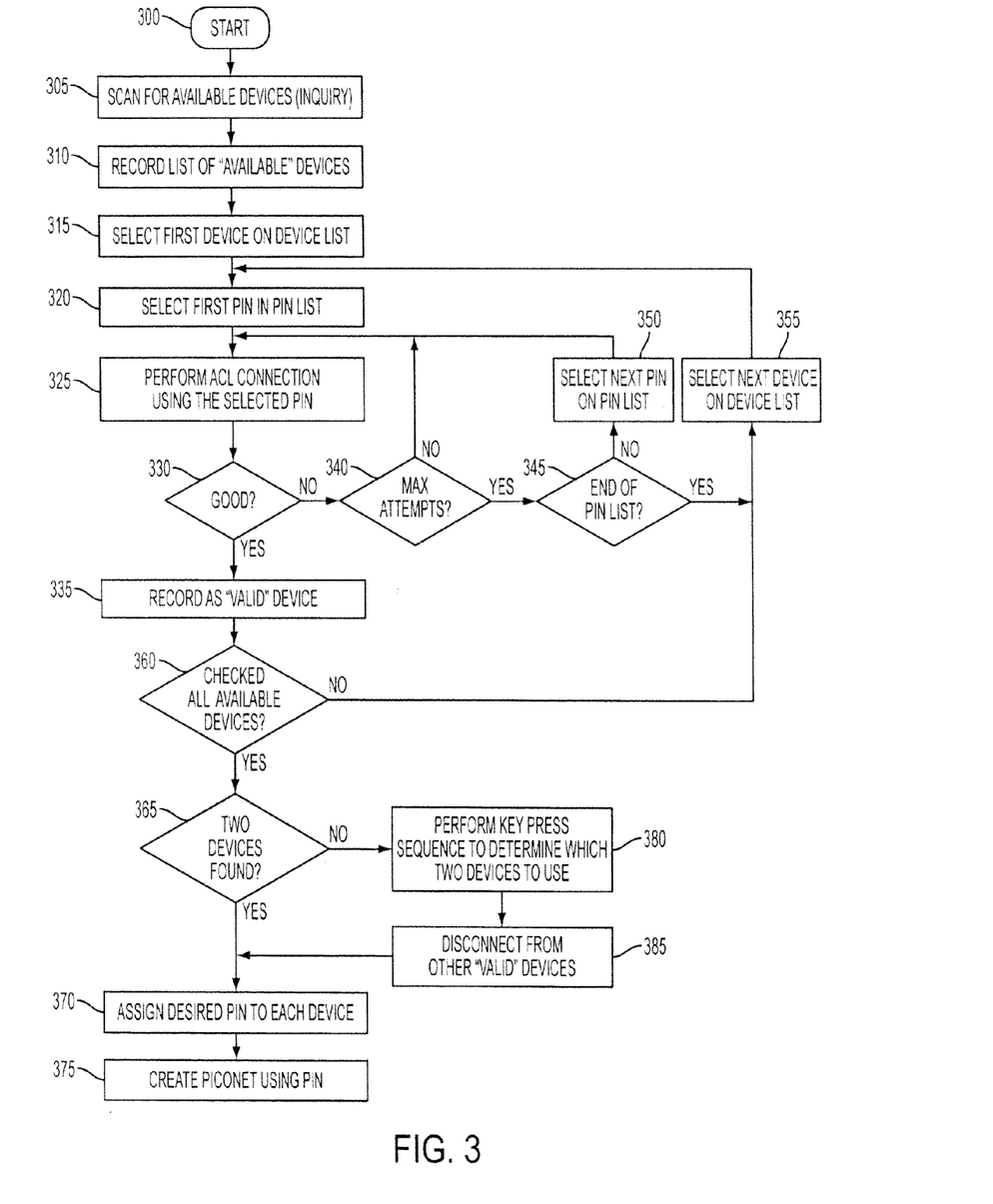
FIG. 3 is a flow chart illustrating an exemplary method of establishing a wireless network according to the present disclosure.

This method of establishing a wireless network using PINs will now be described in detail with reference to the flow chart of FIG. 3, wherein the steps are performed by the processor 120a of master controller 120. At the start of the process (step 300), the master controller 120 scans for available devices (step 305) and records a list of available devices (step 310). The first device on the device list is selected at step 315, and one of a predetermined set of PINs is selected at step 320, such as a default PIN. At step 325, the master controller 120 attempts to establish an ACL connection with the selected device using the default PIN.

If a connection is established (step 330), the selected device is recorded as a valid device at step 335. If a connection cannot be established using the default PIN after a predetermined number of attempts (step 340), the master controller 120 will try to establish the ACL connection using each of the other predefined PIN's until a connection is made or all of the predefined PIN's are used (steps 345 and 350).

After the validity of the first available device on the list is determined, the next device on the list is selected at step 355, and its validity is determined by performing steps 320-350. After all the available devices on the device list have been checked (step 360), the master controller 120 determines whether a predetermined number of valid devices (e.g., exactly two devices) have been found (step 365). If so, all the valid devices are assigned a PIN at step 370, either the default PIN or a PIN pre-stored in the master controller 120, and a piconet is formed at step 375 using the PIN.

If it is determined at step 365 that more than the predetermined number of valid devices has been found, the user must manually select which of the valid devices are to be part of the network; for example, by operating an input device such as a key on each selected valid device (step 380). The master controller 120 polls the valid devices, and records each selected device's BDADDR, while disconnecting from the unselected valid devices (step 385). The selected valid devices are then assigned a PIN at step 370, and a piconet is formed at step 375 using the PIN.

As an alternative to using PINs to identify slave devices, the system can set up a piconet using the unique Bluetooth Address (BDADDR) of each slave radio. In this example, the master controller 120 does not assign a PIN to the slave devices 130 in the piconet. Instead, each slave device 130 is connected to the piconet using its Bluetooth address.

Figure 4:
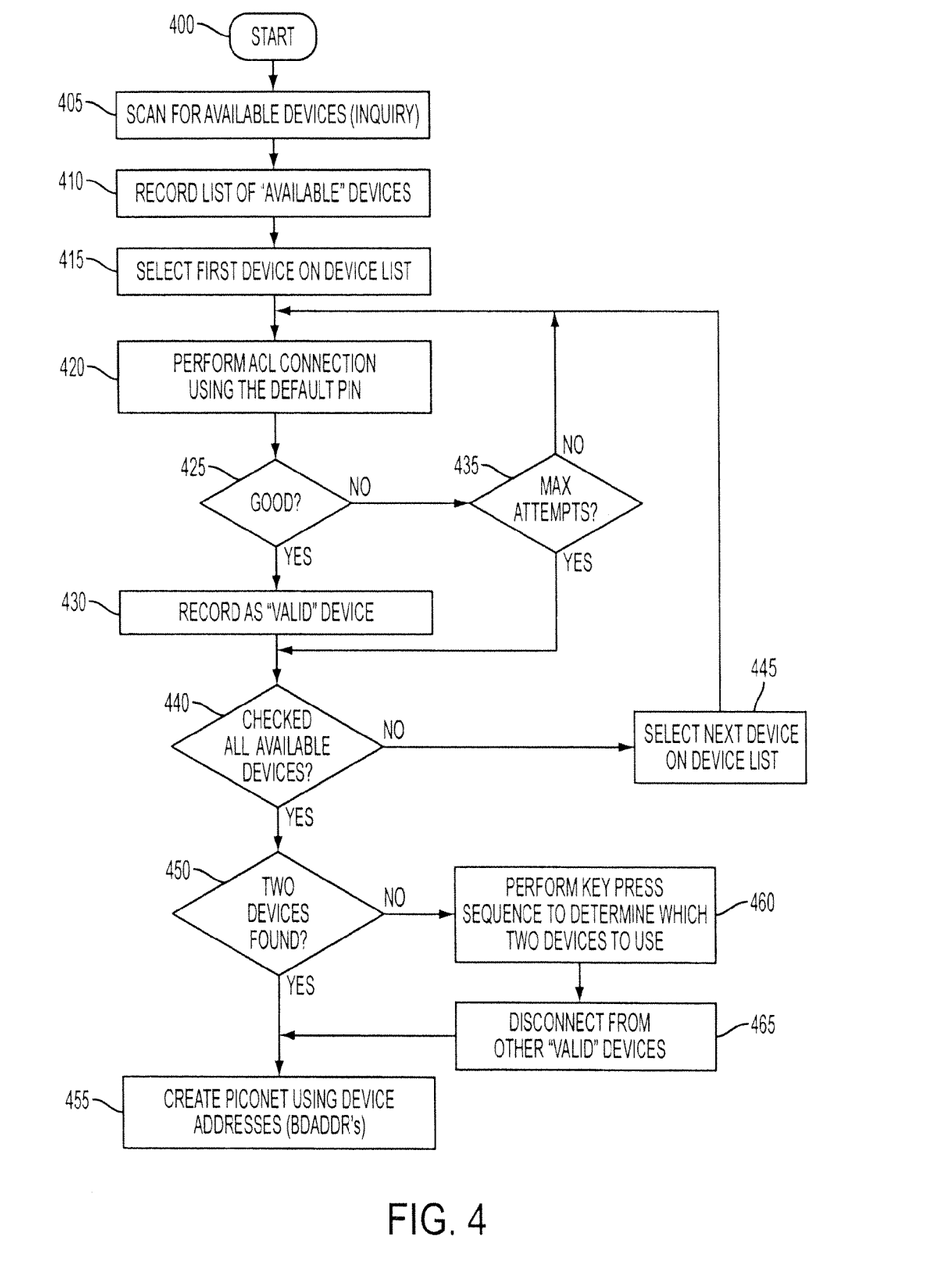
FIG. 4 is a flow chart illustrating another exemplary method of establishing a wireless network according to the present disclosure.

This method of establishing a wireless network using BDADDRs will now be described in detail with reference to the flow chart of FIG. 4, wherein the steps are performed by the processor 120a of master controller 120. At the start of the process (step 400), the master controller 120 scans for available devices (step 405) and records a list of available devices (step 410). The first device on the device list is selected at step 415, and at step 420, the master controller 120 attempts to establish an ACL connection with the selected device using the default PIN.

If a connection is established (step 425), the selected device is recorded as a valid device at step 430. If a connection cannot be established using the default PIN after a predetermined number of attempts (step 435), the next device on the list is selected at steps 440 and 445, and its validity is determined by performing steps 420-435. After all the available devices on the device list have been checked (step 440), the master controller 120 determines whether a predetermined number of valid devices (e.g., exactly two devices) have been found (step 450). If so, a piconet is formed at step 455 using the BDADDRs of the valid devices.

If it is determined at step 450 that more than the predetermined number of valid devices has been found, the user must manually select which of the valid devices are to be part of the network; for example, by operating an input device such as a key on each selected valid device (step 460). The master controller 120 polls the valid devices, and records each selected device's BDADDR, while disconnecting from the unselected valid devices (step 465). A piconet is then formed at step 455 using the BDADDRs of the selected valid devices.

In yet another example, the BDADDRs of the slave devices 130 that the user wants to be part of the wireless network are manually entered directly into the master controller 120 via an input device, such as a keypad 120*e* shown in FIG. 2. In this example, the master controller 120 does not search for available/valid devices.

In order to make the training less intrusive, in other examples of the disclosure a fast training mode is provided, to be used if a shop only has only one aligner. In this mode, both slave devices 130 are turned on, and if only two slave devices 130 are found, the piconet will be created automatically and the default PIN assigned. Alternatively, Bluetooth Addresses (BDADDRs) are used.

During piconet training mode, the operator is guided through each step of the process by computer generated sensory perceptible stimuli, such as a series of display screens. The trained mode is then stored to a computer readable storage media, such as a database on the hard drive of the main processor 110. The trained mode data set is the BlueTooth Device Address (BDADDR) and the associated PIN code to be used to create the ACL connection in the full PIN embodiment of FIG. 3. In the alternative embodiment of FIG. 4, only the Bluetooth Device Address (BDADDR) is saved for the devices associated with the particular master controller.

Once a network has been established, several standard features of Bluetooth devices may be used to monitor the network and make optimal uses of the resources available. These include link quality, signal strength, and transmit power level assessments. Link quality represents the quality of the link between two Bluetooth devices. The higher the value, the better the quality. Signal strength represents the difference in the measured signal strength and the limits of the Golden Receive Power Range (GRPR). A positive value indicates how many db (decibel) the level is above the GRPR. A negative value indicates how many db (decibel) the level is below the GRPR. A value of zero indicates the value is within the GRPR. Transmit power level represents the current transmit power level for a particular link in units of dBm.

The current signal strength and link quality can be monitored and displayed; e.g., at the master controller 120 or main processor 110, to show how well the network is functioning. The software in the master controller 120 or main processor 110 can also make recommendations and/or diagnoses based upon these values. Some examples are: "Other devices are interfering with the network," and "Sensor pods are too far away from the console." The transmit power level reading can be used to limit the power used by the radio system in order to enhance and extend battery life.

In summary, a proprietary closed (non-adaptable) wireless service system network is disclosed, wherein standard Bluetooth wireless modules are connected within each device of the service system. A custom wireless access point is designed as a bridge between the closed Bluetooth-based wireless network and a standard Ethernet network connection to the service system host. The closed wireless network configuration is established by programming each service system device to set up the associated embedded Bluetooth module with a predetermined specific known name and link key code. Each embedded Bluetooth module could be further configured to be non-discoverable and therefore remain unknown by any non-proprietary service system device in proximity searching for wireless network devices. A network controller is programmed to establish the Bluetooth network based on known, standard, expected devices of a specific proprietary service system.

In the disclosed network configuration, a single master device transmits instructions to the other connected proprietary wireless devices, which devices are slave devices and only transmit information in response to instructions from the master device.

The implementation of the described communications techniques are not limited to wheel alignment. They are useful in many other automotive service equipment applications such as wheel balancers, tire changers, or collision damage measurement systems. They are also usable in non-automotive applications.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

Whiles the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A vehicle service system comprising a main processor, a master controller and at least one slave device;
    wherein the master controller has a wireless module for wirelessly communicating with the at least one slave device;
    wherein the at least one slave device is for gathering vehicle sensor data and transmitting the data to the master controller via the wireless module;
    wherein the master controller includes a processor configured to pre-process vehicle data gathered by the at least one slave device; and
    wherein the main processor and the master controller are in communication with each other via a standard communications link, and the processor of the master controller sends the processed data to the main processor for further processing.

2. The system of claim 1, wherein the vehicle sensor data comprises data from a vehicle internal sensor.

3. The system of claim 1, wherein the vehicle sensor data comprises data from an external tire pressure sensor.

4. The system of claim 1, wherein the vehicle sensor data comprises data from a ride height sensor.

5. The system of claim 1, wherein the vehicle sensor data comprises data from a steering wheel angle sensor.

6. A vehicle service system comprising a master controller and at least one slave device;
    wherein the master controller has a wireless module for wirelessly communicating with the at least one slave device;

wherein the at least one slave device is for gathering vehicle service data and transmitting the data to the master controller via the wireless module; and wherein the master controller includes a processor configured to pre-process the vehicle service data gathered by the at least one slave device and serve the processed data using a standard communications link.

7. The system of claim 6, wherein the processor is configured as a web server to serve the processed data as a web page to a browser based client.

8. A vehicle service system comprising a main processor, a master controller and at least one slave device;

wherein the master controller has a wireless module for wirelessly communicating with the at least one slave device;

wherein the at least one slave device is for gathering vehicle data and transmitting the data to the master controller via the wireless module;

wherein the master controller includes a processor configured to pre-process vehicle data gathered by the at least one slave device; and wherein the main processor and the master controller are in communication with each other using a standard communications link, and the processor of the master controller sends the processed data to the main processor for further processing and to a second networked service system.

9. The system of claim 8, wherein the second networked service system comprises a shop management system.

10. The system of claim 8, wherein the second networked service system comprises a second alignment system.

11. The system of claim 8, wherein the second networked service system comprises a collision repair system.

* * * * *